(12) United States Patent
Lawton et al.

(10) Patent No.: US 10,415,771 B2
(45) Date of Patent: Sep. 17, 2019

(54) WEARABLE TUBULAR LIGHT GENERATING ITEM WITH KINETIC GENERATOR HAVING A SLIDEABLE MAGNETIC DISPOSED WITHIN TUBE

(71) Applicants: Positively Human Ltd., Malmesbury (GB); Thomas Alexander Lawton, Malmesbury (GB); Benjamin Jandrell, Oswestry (GB)

(72) Inventors: Thomas Alexander Lawton, Malmesbury (GB); Benjamin Jandrell, Oswestry (GB)

(73) Assignee: Positively Human Inc., Malmesbury (GB)

( * ) Notice: Subject to any disclaimer, the term of this patent is extended or adjusted under 35 U.S.C. 154(b) by 0 days.

(21) Appl. No.: 15/755,074

(22) PCT Filed: Sep. 16, 2016

(86) PCT No.: PCT/IB2016/001414
§ 371 (c)(1),
(2) Date: Feb. 24, 2018

(87) PCT Pub. No.: WO2017/033062
PCT Pub. Date: Mar. 2, 2017

(65) Prior Publication Data
US 2018/0245750 A1 Aug. 30, 2018

Related U.S. Application Data

(60) Provisional application No. 62/209,258, filed on Aug. 24, 2015.

(51) Int. Cl.
*F21L 13/06* (2006.01)
*F21L 13/00* (2006.01)
(Continued)

(52) U.S. Cl.
CPC ............... *F21L 13/06* (2013.01); *F21L 13/00* (2013.01); *H02K 35/02* (2013.01); *F21V 31/00* (2013.01);
(Continued)

(58) Field of Classification Search
CPC ...... F21Y 2121/06; H02K 35/02; F21L 13/00; F21L 13/02; F21L 13/04; F21L 13/06; F21L 13/08
See application file for complete search history.

(56) References Cited

U.S. PATENT DOCUMENTS 5,818,132 A * 10/1998 Konotchick ........... H02K 35/02
310/17
5,975,714 A * 11/1999 Vetorino ................ H02K 35/02
310/15

(Continued)

*Primary Examiner* — Robert J May
(74) *Attorney, Agent, or Firm* — JD Patent; Julian Forman (57) ABSTRACT

Provided are wearable lights or lights that can be attached to accessories when carrying out activities in low-light or no-light conditions. The wearable lights incorporate a portion of non-magnetic material with an internal chamber with a low friction internal surface that is surrounded by a copper coil. A magnet is passed through the internal chamber, allowing the copper coil to break the magnetic fields of the magnet, which creates a burst of electrical current. The current is used to emit light through LED's. Movement of the wearer/user generates the movement of the magnet in the internal chamber, and repelling magnets at the top and bottom of the internal chamber assist the magnet in moving back and forth through the chamber. The inventive device can be adapted for use in many sporting and other applications, such as in running shoes, running belts, rucksacks and as stand-alone wearable lights.

12 Claims, 5 Drawing Sheets

(51) Int. Cl.
*H02K 35/02* (2006.01)
*F21W 121/06* (2006.01)
*F21Y 115/10* (2016.01)
*F21V 31/00* (2006.01)

(52) U.S. Cl.
CPC ...... *F21W 2121/06* (2013.01); *F21Y 2115/10* (2016.08)

(56) References Cited

U.S. PATENT DOCUMENTS

| | | | | |
|---|---|---|---|---|
| 6,220,719 | B1* | 4/2001 | Vetorino | F21L 13/06 362/192 |
| 6,575,587 | B2* | 6/2003 | Cramer | F21L 14/00 362/105 |
| 6,808,288 | B2* | 10/2004 | Mah | H02K 35/02 362/192 |
| 7,232,238 | B2* | 6/2007 | Long | F21L 13/06 362/157 |
| 2003/0155771 | A1* | 8/2003 | Cheung | H02K 35/02 290/1 R |

\* cited by examiner

WEARABLE TUBULAR LIGHT GENERATING ITEM WITH KINETIC GENERATOR HAVING A SLIDEABLE MAGNETIC DISPOSED WITHIN TUBE

CROSS-REFERENCE TO RELATED APPLICATIONS

This is a U.S. National Stage of International Application PCT/IB2016/001414, filed Sept. 16, 2016, which claims the benefit of United States Provisional Application No. 62/209, 258, filed Aug. 24,2015.

FIELD OF THE INVENTION

The present invention relates to wearable lights or lights that can be attached to clothing, accessories or equipment when carrying out activities in low-light or no-light conditions. The invention incorporates a kinetic generator that produces light from the wearer's motion without the need for batteries or any other adjunct power source. Specifically, the invention relates to a magnetic-based solution for generating electricity that can then be used to power one or more light emitting diodes (LED's) without the need for any backup battery or other power source. The lighting solution can be miniaturized and waterproof, amongst other benefits, thus presenting opportunities for use in numerous applications, such as running lights and other sporting apparel.

BACKGROUND OF THE INVENTION

Currently, all wearable lights used for safety or for carrying out an activity in low-light or no-light conditions require batteries and, consequently, can stop working at precisely the moment when they are needed. Some known devices have replaceable or rechargeable batteries, but the common feature is that some form of integrated or backup power source is needed for continuous operation.

Some known products use motion sensing to activate or deactivate an onboard light so as to reduce power usage. Also, other known devices use rechargeable batteries so as to reduce the need for battery changes and reduce overall cost of the system. However, none of the known systems operate without batteries altogether and this has several drawbacks. First, even a rechargeable battery can run out during an activity or when light is needed. Second, any battery-operated system requires maintenance and/or eventual replacement of batteries. Also, use of rechargeable batteries can be beneficial but it increases initial cost of the system.

Accordingly, there is a need for a wearable or accessory-based lighting system that does not use any form of battery or backup power and, rather, generates electricity through the user's motion. The system should be amenable to miniaturization in appropriate applications, should be waterproof when needed, should require no maintenance and its operation should last for an essentially unlimited amount of time. The applicants note that a system without batteries or other backup power sources will not need to be prepared before use (such as with charging) and will no waste footprint or environmental impact, such as that which is caused by the disposal of batteries. Therefore, the aim of the present invention is to provide a wearable or accessory-based light with the above attributes that can be used in a variety of sporting and other applications.

SUMMARY OF THE INVENTION

The current invention comprises wearable lights or lights that can be attached to accessories when carrying out activities in low-light or no-light conditions. The invention finds application, solely by way of example, in running lights and other sporting apparel.

Taking the example of a running light, the device incorporates a portion of non-magnetic material with an internal chamber with a low friction internal surface that is surrounded by a copper coil. A magnet is passed through the internal chamber, allowing the copper coil to break the magnetic fields of the magnet, which creates a burst of electrical current. The current is used to emit light through LED's. Movement of the wearer/user generates the movement of the magnet in the internal chamber, and repelling magnets at the top and bottom of the internal chamber assist the magnet in moving back and forth through the chamber. Together, these attributes allow for continuous movement of the magnet with user movement, thus providing a continuous source of electricity and, thus, light through the LED's.

The inventive device can be adapted for use in many sporting and other applications. Examples include use in ski poles, fishing equipment, backpacks and athletic clothing.

BRIEF DESCRIPTION OF DRAWINGS

The invention will be better understood according to the following detailed description of several embodiments with reference to the attached drawings, in which.

DETAILED DESCRIPTION OF THE INVENTION

Figure 1:
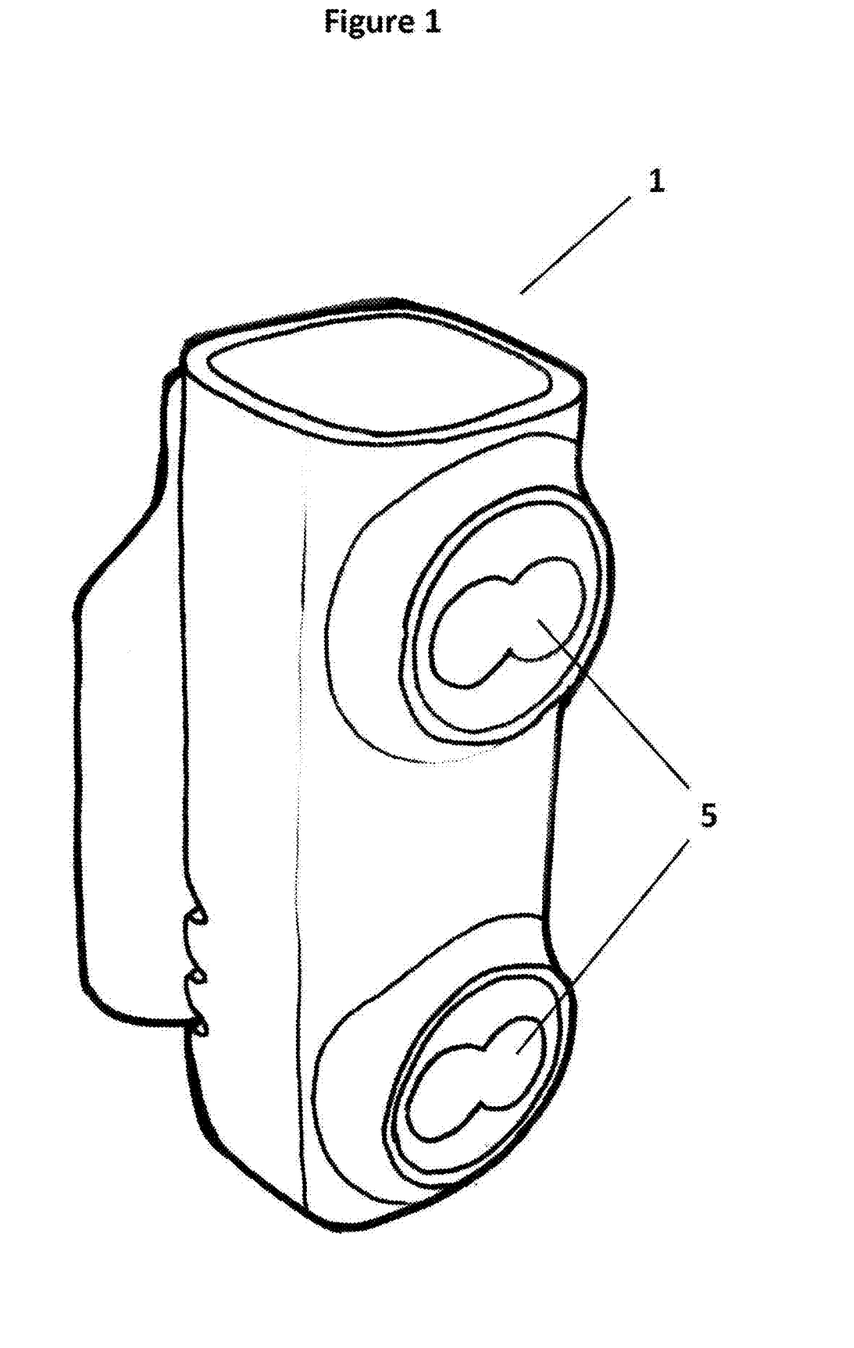
FIG. 1 presents a generalized overview of a wearable light according to an embodiment of the present invention.
Figure 2:
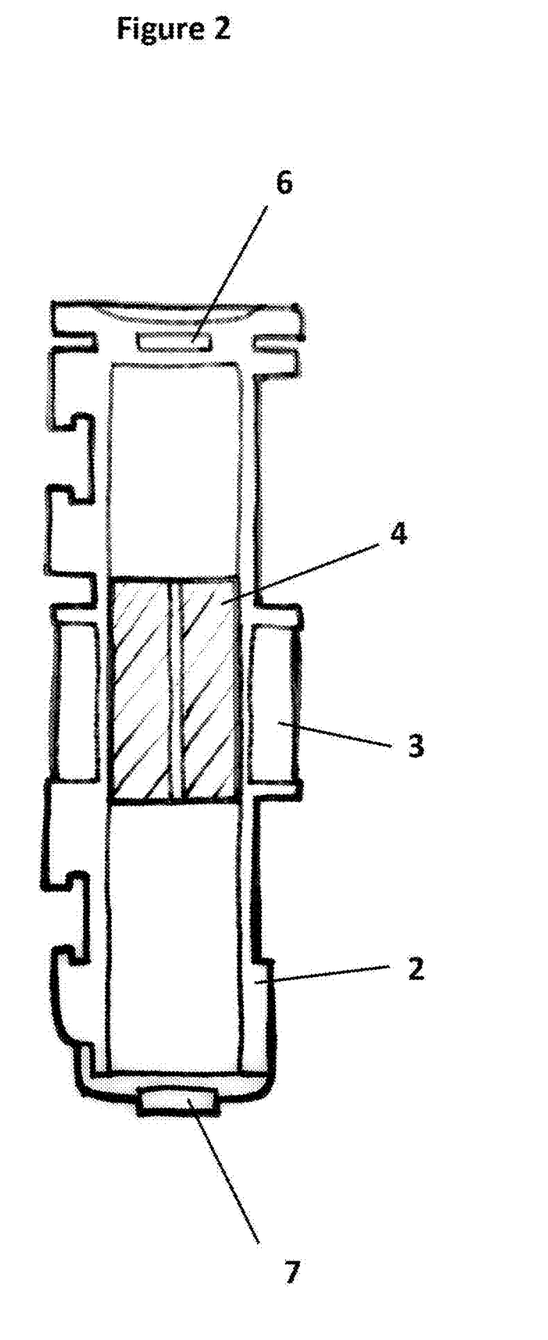
FIG. 2 presents a cross section of a wearable light according to an embodiment of the present invention.
Figure 3:
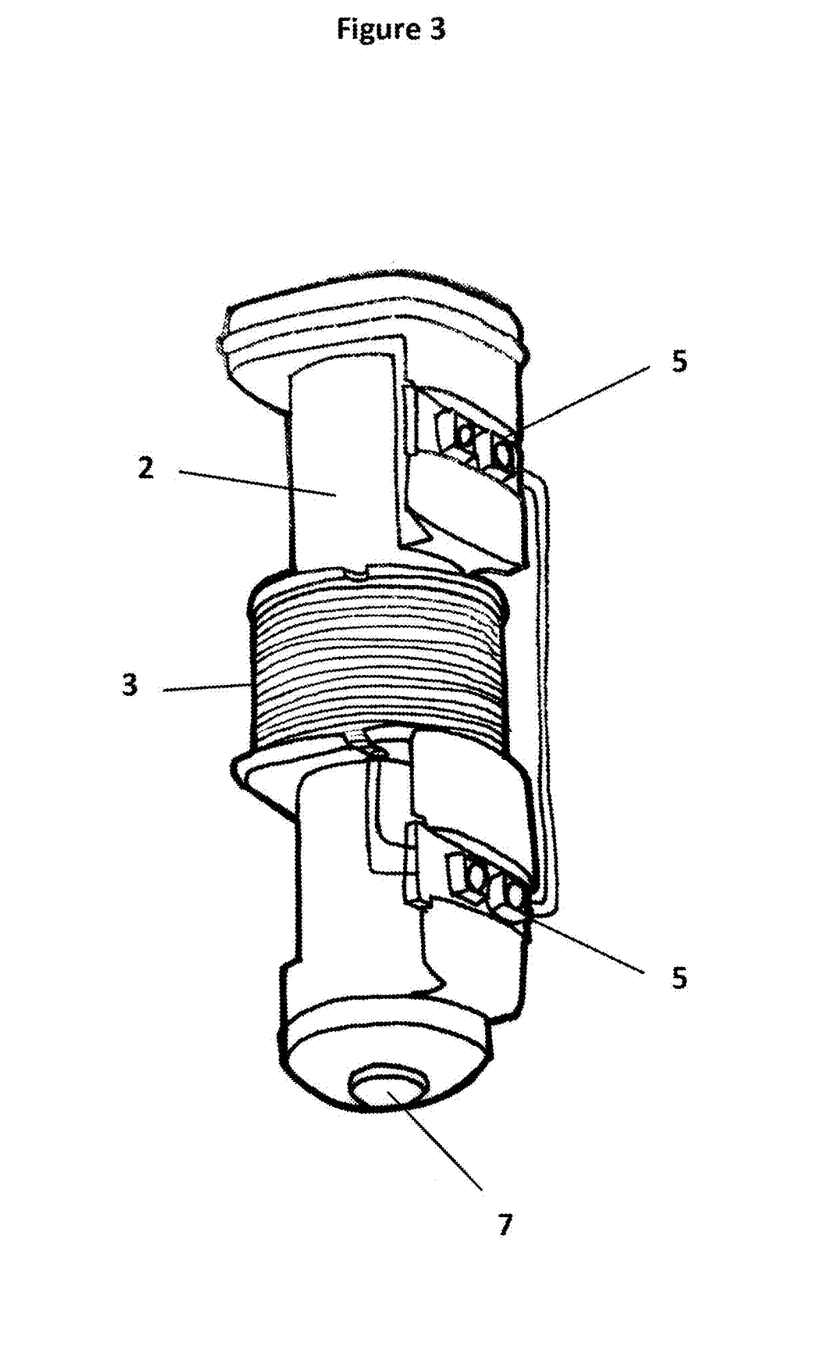
FIG. 3 presents a cut-away view of the internal features of a wearable light according to an embodiment of the present invention.
Figure 4:
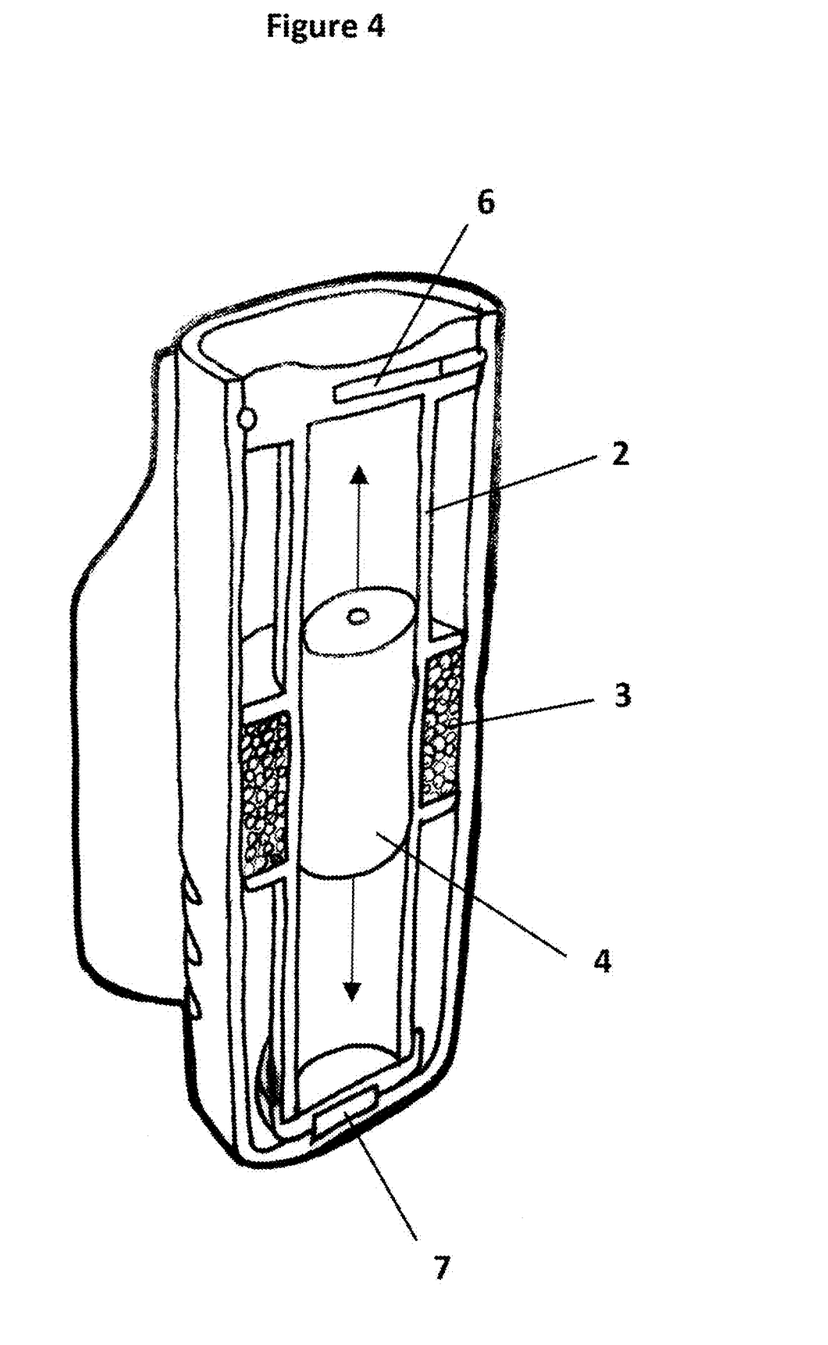
FIG. 4 presents a cross-sectional internal view of a wearable light including a demonstration of the movement path of a magnet used to generate an electrical current according to an embodiment of the present invention.
Figure 5:
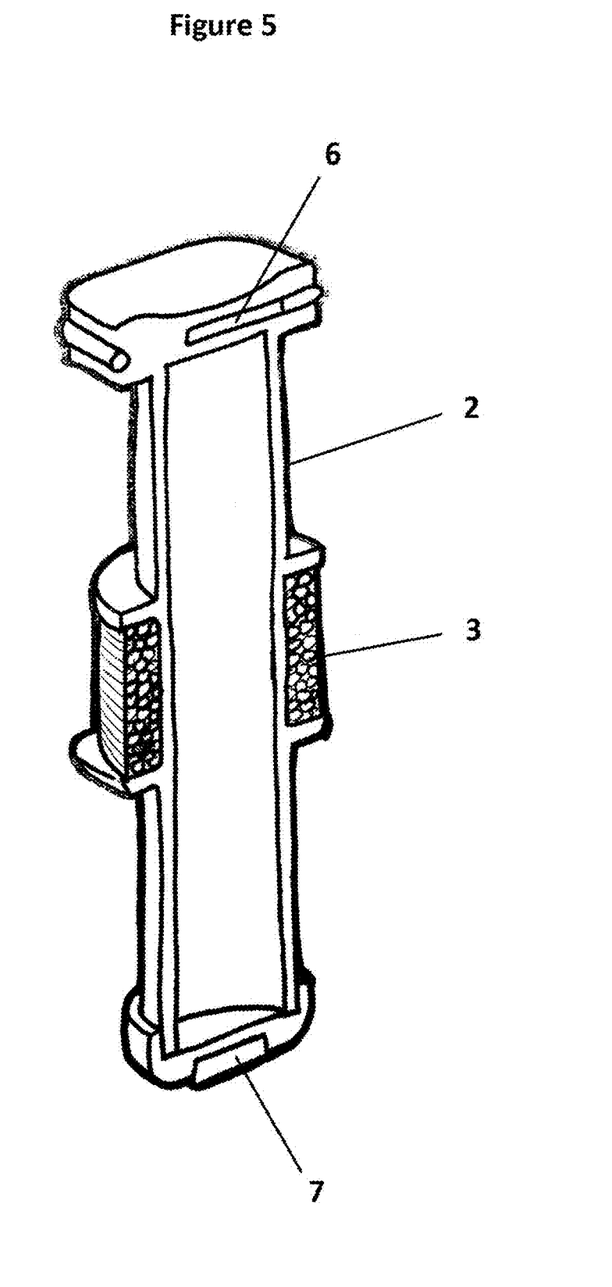
FIG. 5 presents a further cross-sectional internal view of a wearable light including a copper coil used to break a magnetic field and generate an electrical current according to an embodiment of the present invention.

The core of the invention is a kinetic electricity generator 1 shown in various embodiments in FIGS. 1 through 5. The invention incorporates a tube section 2 made of non-electrical conducting material with a low friction surfaced internal chamber and surrounded by a wound copper wire coil 3. Then a magnet (functioning in the system as a generator magnet 4) is passed through the tube allowing the copper coil 3 to break the magnetic fields of the generator magnet 4 as it passes creating a burst of electrical current. This current is then used to emit light through the use of LEDs 5. The inventive system is designed with back-to-back LED's 5 to eliminate the need for a diode bridge or bridge rectifier, which would drain power unnecessarily. The system is configured to allow the movement or shaking of the device to stimulate an up and down (or back and forth) movement of the generator magnet 4 through the copper coil 3. Ongoing movement thus generates multiple bursts of electricity that power ongoing illumination of the LED's 5. The design also incorporates magnets (functioning in the system as repelling or deflecting magnets 6 and 7) at the top and bottom of the coil tube arranged with their poles positioned in opposition to the generator magnet 4. This allows the opposing magnetic forces to also assist with the ongoing movement of the generator magnet 4 by repelling it as it nears either end of the tube 2.

The even winding of the copper wire 3 of optimum gauge and the minimum friction of the inner surface of the coil tube 2 are key to allow a high level of electricity generation through easy movement of the generator magnet 4 and a clean harvesting of power from the coil. A high quality magnet with a good level of magnetic field strength and longevity of magnetic properties are also beneficial for the long life of the product and good electricity production. The arrangement of the repelling magnets 6 and 7 also reduces the motion or effort required to propel the generator magnet 4 through the coil, thus allowing the product to generate electricity and emit light with only very small amounts of physical movement.

The wound copper wire has a gauge of between 0.05 mm and 0.2 mm, optimally between 0.06 mm and 0.17 mm and most preferably it has a gauge of 0.08 mm. Applicants have found that wire gauges below this range are not suitable for production winding and wire gauges above this range have too much resistance and, thus, pose a barrier to passage of the electrical current. Approximately 120 turns of wire are used on a tube with a diameter of 11.5 mm. One of skill in the art will appreciate that variations in tube diameter and number of wire turns will produce similar results. The copper coil 3 in the inventive system was tuned to achieve the best resistance for optimum voltage and current characteristics without damaging the LED's 5. In the working example presented herein, Applicants found that this resistance value was approximately 100 ohms.

The inventive tube section 2 with a low friction internal chamber has an internal diameter of approximately 10.2 mm, although this can vary proportionately to overall tube diameter if larger or smaller tube sections are used. In the working example provided herein, a tube section 2 with an overall diameter of 11.5 mm and an internal diameter of 10.2 mm accommodates a generator magnet of 10 mm in diameter. While the use of a low friction internal surface of the tube 2 is important, the skilled artisan will realize that the above dimensions allow for clearance between the generator magnet 4 and the internal surface of the tube 2, thus allowing for easy passage of the generator 4 magnet along the length of the tube 2.

The tube section 2 should be cylindrical and it should be paired with a cylindrical magnet. This allows the magnet to rotate during operation of the system. If the magnet could not rotate (such as in a system with square or rectangular dimensions), the required sensitivity would not be achieved and electricity generation would suffer.

Magnets used in the inventive system are neodymium rare earth magnets, allowing for strong magnets that are small in size. With reference to the above working example, the generator magnet 4 is an N52 magnet, 10 mm in diameter and 15 mm in height. The generator magnet 4 has a 1 mm diameter hole longitudinally through its middle, which prevents any piston effect during operation. This feature is important as the system must be sealed for waterproofing. Use of a strong magnet such as an N52 magnet is key to miniaturization of the inventive system. Applicants are aware of the development of N56 magnets, although they are not, as of Applicants' first filing date, available for production and commercialization. Use of even stronger magnets in the inventive system would allow for even greater miniaturization.

Again with reference to the above working example, the height of the copper coil 3 is 12.7 mm. While the power generation of the system might be more efficient of the height of the copper coil matched the height of the magnet, Applicants have found that the travel distance for the magnet in a system with matching coil and magnet heights does not match well with the motion of an athlete such as a runner.

In order to provide efficient electricity generation, the generator magnet 4 must pass completely in and out of the copper coil 3 at the top and bottom. In the working example cited herein, the 15 mm generating magnet 4 clears the 12.7 mm coil by 1 mm, thus requiring approximately 45 mm of tube length without taking into account the height of the repelling magnets 6 and 7.

The repelling magnets 6 and 7 used in the working example are N35 magnets. They do not need to be as powerful as the generator magnet 4 because their purpose is solely to produce a no-contact rebound of the generator magnet 4 so that it will pass back and forth through the copper coil. Applicants have found that a no-contact rebound is preferred so that there is no damage to the magnets from contact with each other, thus increasing system durability. Also, no-contact rebound obviates the need for any springs or other similar elements, thus reducing system complexity and also increasing system durability. With reference again to the working example, the bottom repelling magnet 7 is 6 mm diameter and 1 mm in height and the top repelling magnet 6 is 6 mm in diameter and 0.5 mm in height. The bottom repelling magnet 7 is more powerful as gravity must be overcome in creating the rebound necessary to send the generator magnet 4 back through the copper coil 3 when it reaches the bottom of the tube 2.

A further iteration of the invention would also allow storage of excess energy generated (beyond the maximum requirement of the LEDs) in a capacitor or similar charge storage device. This would then allow that previously excess energy to then be released in the event that the product's motion stops. This would add the additional advantage that the product would continue to emit light even in situation where the wearer's movement is reduced or stopped for a short period (such as at a traffic light, for example). Another iteration of the design might be the alternative arrangement of the tube and coil (or use of multiple coils or tubes) to generate greater power or work more efficiently with a specific type of motion. It is optimized in its current embodiment to generate electricity through the movement related to the running or walking of a wearer. However the use of a circular tube section with multiple copper coil sections may work more appropriately when the movement is circular such as the ankle of a wearer pedalling a bicycle.

The kinetic generator at the core of this system demonstrates the ability to create sufficiently useful levels of electrical charge through the use of magnets, a copper coil and movement. Variants allow storage of unused generated charge and alternative coil and magnets arrangements to adapt and optimize the generator to different types of movement. In the immediate embodiment of the invention this charge is converted into light using LEDs. However the electrical charge generated by such a kinetic movement generator could be used for any application that requires the use of electrical current. Particularly as higher levels of efficiency and higher grade components are used or discovered. There is also the option to miniaturize the generator to work in smaller products or environments.

There are also a growing range of low power electrical components coming to market that would increase the viability of using a generator like this as a power source in either the replacement or supplementing of batteries. We foresee the use of these kinds of generators powering or assisting to power a number of electrical wearable devices that are used when the wearer is carrying out movement based activity, particularly fitness or sports related activities. Rather than just people, the generator could also be configured to work on other products that move, or are involved in movement, such as a bicycle or a tracking/sensor device attached to anything that moves. The generator does not need to be built into a specific end device. It could also be combined with a battery to produce a power pack that not only holds charge but uses movement to incrementally charge the battery and maintain power levels without the need for traditional charging methods. A power pack could then distribute that power to devices using standard mechanisms such as USB connectivity. Incorporating a solar charging device to maintain charge levels through light and or movement could supplement it further. This is particularly relevant as IoT products are developed that require power and yet the ongoing management and maintenance required to keep many small electrical items charged/powered can be very time consuming and costly. Our kinetic generator and further iterations of it that work with other existing battery and solar technologies could vastly reduce this burden for consumers and product developers.

While this invention has been shown and described with reference to particular embodiments thereof, it will be understood by those skilled in the art that various changes in form and details may be made therein without departing from the spirit and scope of the invention. Solely by way of example, the inventive device can be incorporated into a wearer's apparel, such as clothing or a running shoe, but could also be a stand-alone device that could be clipped onto the user's apparel, such as onto a belt. While the inventive device has been described as having utility in the context of a running light, whether clipped onto the user or incorporated into a shoe, the device could also be used on ski pole, backpack, paddle or whistle/integrated safety product. Also, the inventive device could be used on children's toys for illumination, safety or aesthetic benefits.

In each of the additional embodiments described above, it is often the case that the orientation of the wearable/attachable/integrated light is important to proper function. In most cases, it will be advantageous to orient the light vertically so that the light engine pulls away from gravity when the item that the wearable/attachable/integrated light is attached to is in motion. In each embodiment, the one or more LED's can be positioned to offer the best visibility and utility for the particular use. Various examples will now be presented illustrating these concepts.

The wearable/attachable/integrated light of the present invention can be attached to apparel such as a shirt, running belt, shorts, hat or compression socks. The orientation of the light should be vertical so as to pull away from gravity when the wearer is in motion and the light should be positioned near the waist of the wearer and towards the centre of the user's body, such as for example on the bottom of the wearer's t-shirt or on the waistband of the wearer's running belt. Placement of the LED's can be anywhere providing optimal visibility, either integrated in the same unit as the light or in a separate unit attached by an umbilical cord to the light engine. Additionally, lenses known to one of skill in the art can be used to narrow or widen the light field.

The wearable/attachable/integrated light of the present invention can also be integrated into a running shoe. The light engine should be placed in a vertical position if integrated into the rear portion of the shoe and it can also optionally be placed in a horizontal position if placed on top of the front portion of the shoe on top of the laces. As with the apparel integration, LED's can be placed for optimal visibility and utility and can be integrated into a single unit with the light engine or placed in a separate unit attached to the light engine by an umbilical cord.

In an alternate embodiment, the wearable/attachable/integrated light of the present invention can be integrated into a toy or character doll. In one such example, the light engine could be placed inside the head of the character doll and the LED's could be positioned in the character doll's eyes such that the doll's eyes are lit when the character doll is in motion. In most such embodiments, it will be desirable to have the light engine positioned vertically to take advantage of the likely direction of movement of the character doll by the user. Optionally, the toy or character doll could be attached to the exterior of a rucksack so that light is generated by light engine upon movement of the wearer, and thus the rucksack and consequently the toy or character doll.

Alternate embodiments include, but are not in any way limited to: integration into a wristband with the light engine being positioned across the wrist to take advantage of wearer movements; integration into a dog harness with vertical orientation under the dog's jaw to take advantage of wearer movement; integration into a bicycle mudguard with vertical orientation to take advantage of vibrations generated by movement of the bicycle; and integration into a wand or glow stick with horizontal or vertical orientation to take advantage of different user movements.

One of skill in the art will of course understand that numerous embodiments will be possible for integration of the present light engine beyond those described here. In short, the present invention can be expected to operate in any scenario where a user or wearer or integrated device will generate movement sufficient to move the internal magnet of the light engine enough to generate an electrical current and power the LED's.

What is claimed is:

1. A wearable or attachable light comprising:
a tube with a proximal and distal end forming a lumen along its length and comprising a non-conductive, low friction inner surface;
a copper coil wound around a central portion of the tube;
a generating magnet slidably disposed inside the lumen of the tube;
at least one deflecting magnet disposed at each of the proximal and distal ends of the tube; and
one or more LED's disposed outside the tube;
wherein movement of an item, person or animal to which the wearable or attachable light is attached causes sliding movement of the generating magnet through the tube and thereby generation of electrical current to illuminate the one or more LED's; and
wherein no battery or other integrated independent power source is present.

2. The wearable or attachable light of claim 1, wherein the at least one deflecting magnet at each of the proximal and distal ends of the tube cause additional sliding movement of the generating magnet through the tube to assist in the generation of electrical current to illuminate the LED's.

3. The wearable or attachable light of claim 2, wherein ongoing movement of the item, person or animal to which the wearable or attachable light is attached causes ongoing sliding movement of the generating magnet back and forth between the proximal and distal ends of the tube, thus generating multiple bursts of electrical current and causing ongoing illumination of the one or more LED's.

4. The wearable or attachable light of claim 1, wherein the copper coil breaks the magnetic field of the generating magnet as the generating magnet passes through the portion of the tube that the copper coil is wound around, thus generating a pulse of electrical current used to illuminate the one or more LED's.

5. The wearable or attachable light of claim 1, wherein the copper coil comprises copper wire with a gauge of between 0.1 and 0.2 mm.

6. The wearable or attachable light of claim 1, wherein the generating magnet is an N52 magnet.

7. The wearable or attachable light of claim 1, wherein the deflecting magnets are N35 magnets.

8. The wearable or attachable light of claim 1, wherein the one or more LED's are disposed on the exterior of the tube.

9. The wearable or attachable light of claim 1, wherein the one or more LED's are integrated into a separate wearable or attachable unit connected to the tube by an umbilical cord capable of transmitting the electrical current.

10. A system for illumination in low-light situations comprising:
    a wearable or attachable light comprising:
        a tube with a proximal and distal end forming a lumen along its length and comprising a non-conductive, low friction inner surface;
        a copper coil wound around a central portion of the tube;
        a generating magnet slidably disposed inside the lumen of the tube;
        at least one deflecting magnet disposed at each of the proximal and distal ends of the tube; and
        one or more LED's disposed outside the tube; and
    an item of apparel or equipment to which the wearable or attachable light is attached;
    wherein movement of the item of apparel or equipment to which the wearable or attachable light is attached causes sliding movement of the generating magnet through the tube and thereby generation of electrical current to illuminate the one or more LED's; and
    wherein no battery or other integrated independent power source is present.

11. The system for illumination in low-light situations of claim 10, wherein the item of apparel or equipment is selected from the group consisting of a piece of clothing, a shoe, a sports belt or a rucksack.

12. The system of illumination in low-light situations of claim 10, wherein the tube is oriented vertically so that the generating magnet is pulled away from gravity when the item of apparel or equipment is moved.

* * * * *